United States Patent
Dujol et al.

(10) Patent No.: US 9,869,187 B2
(45) Date of Patent: Jan. 16, 2018

(54) TURBOMACHINE TURBINE BLADE COMPRISING A COOLING CIRCUIT WITH IMPROVED HOMOGENEITY

(71) Applicant: SAFRAN AIRCRAFT ENGINES, Paris (FR)

(72) Inventors: Charlotte Marie Dujol, Saint-Mande (FR); Patrice Eneau, Moissy-Cramayel (FR); Sebastien Digard Brou De Cuissart, Paris (FR); Matthieu Jean-Luc Vollebregt, Asnieres sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/305,605

(22) PCT Filed: Apr. 23, 2015

(86) PCT No.: PCT/FR2015/051111
§ 371 (c)(1),
(2) Date: Oct. 20, 2016

(87) PCT Pub. No.: WO2015/162389
PCT Pub. Date: Oct. 29, 2015

(65) Prior Publication Data
US 2017/0037733 A1 Feb. 9, 2017

(30) Foreign Application Priority Data
Apr. 24, 2014 (FR) ...................................... 14 53708

(51) Int. Cl.
*F01D 5/18* (2006.01)

(52) U.S. Cl.
CPC ........ *F01D 5/187* (2013.01); *F05D 2220/323* (2013.01); *F05D 2240/301* (2013.01);
(Continued)

(58) Field of Classification Search
CPC ............ F01D 5/18; F01D 5/186; F01D 5/187; F01D 5/188; F01D 5/189; F01D 9/065;
(Continued)

(56) References Cited

U.S. PATENT DOCUMENTS

| | | | | |
|---|---|---|---|---|
| 5,395,212 A | * | 3/1995 | Anzai | F01D 5/187 415/115 |
| 5,536,143 A | * | 7/1996 | Jacala | F01D 5/187 416/96 R |

(Continued)

FOREIGN PATENT DOCUMENTS

| | | |
|---|---|---|
| EP | 1 111 190 A1 | 6/2001 |
| EP | 1 288 438 A1 | 3/2003 |

(Continued)

OTHER PUBLICATIONS

International Search Report issued Sep. 21, 2015 in PCT/FR2015/051111 filed Apr. 23, 2015.

(Continued)

*Primary Examiner* — Gregory Anderson
*Assistant Examiner* — Julian Getachew
(74) *Attorney, Agent, or Firm* — Oblon, McClelland, Maier & Neustadt, L.L.P.

(57) ABSTRACT

The internal cooling of moving blades of turbines in aircraft turbomachines is limited in effectiveness because of inhomogeneities of this cooling on each of the pressure-side and suction-side walls. To address this problem, there is proposed a blade including a circuit for cooling the airfoil part thereof, in which circuit the cavities interconnected in series are such that the stream of air flows radially toward the outside along the pressure-side wall in pressure-side cavities, and radially toward the inside along the suction-side wall in a suction-side cavity that is separated from the pressure-side cavities by an internal wall of the airfoil part. In this way, the force of the Coriolis effect deflects the stream of air toward each of the pressure-side and suction-side walls thereby limiting the inhomogeneity.

10 Claims, 4 Drawing Sheets

(52) U.S. Cl.
CPC ....... *F05D 2260/221* (2013.01); *Y02T 50/673* (2013.01); *Y02T 50/676* (2013.01)

(58) Field of Classification Search
CPC ......... F05D 2220/323; F05D 2240/301; F05D 2260/221; F05D 2260/2212; F05D 2260/22141
See application file for complete search history.

(56) References Cited

U.S. PATENT DOCUMENTS

| | | | |
|---|---|---|---|
| 6,331,098 B1 | 12/2001 | Lee | |
| 6,554,571 B1 * | 4/2003 | Lee | F01D 5/187 416/92 |
| 6,916,155 B2 * | 7/2005 | Eneau | F01D 5/186 415/115 |
| 2003/0044278 A1 | 3/2003 | Eneau et al. | |
| 2005/0025623 A1 | 2/2005 | Botrel et al. | |
| 2007/0122282 A1 | 5/2007 | Deschamps et al. | |

FOREIGN PATENT DOCUMENTS

| | | |
|---|---|---|
| EP | 1 503 038 A1 | 2/2005 |
| EP | 1 790 819 A1 | 5/2007 |

OTHER PUBLICATIONS

French Search Report Issued Dec. 12, 2014 in French Application No. 14 53708 Filed Apr. 24, 2014.

\* cited by examiner

TURBOMACHINE TURBINE BLADE COMPRISING A COOLING CIRCUIT WITH IMPROVED HOMOGENEITY

TECHNICAL FIELD

The present invention relates to the field of aircraft turbomachines and more particularly relates to the cooling of the moving blades of the turbines within such turbomachines.

STATE OF PRIOR ART

Within a turbomachine used to propel an aircraft, the turbine blades are subjected to the intense heat of combustion gases coming from the combustion chamber.

To protect these blades against these high temperatures, it is known to cool the blades by means of cooling circuits formed of cavities provided inside the airfoil parts of the blades. These cooling circuits are generally supplied with relatively fresh air taken at a compressor stage of the turbomachine.

Nevertheless, the constant improvement of the performance of aircraft engines leads to a temperature increase of these combustion gases. The progress alone made regarding the materials and coatings used to form the blades does not enable the temperature increase to be counterbalanced.

Consequently, it is desirable to improve the performances of the cooling circuits of the blades.

During their investigation works, the applicant has in particular found that a drawback of the known cooling circuits lies in the inhomogeneity of the cooling on each of the pressure-side and suction-side walls of the blades.

The applicant has identified a cause of such inhomogeneities, as will now be explained in reference to FIG. 1.

FIG. 1 depicts the airfoil part 10 of a turbomachine turbine blade of a known type, seen in cross-section along a transverse plane of the blade, that is a plane orthogonal to the direction of the span or of the length of the airfoil part, which merges with the radial direction with respect to the engine axis when the blade is mounted in a turbomachine turbine.

The airfoil part 10 comprises an internal cooling circuit 12 formed of three cavities extending along the radial direction, arranged between the pressure-side wall 14 and the suction-side wall 16, and interconnected in series so as to enable the flow of a stream of cooling air from an inlet section of the first cavity 18 to the second cavity 20 and then to the outlet section of the third cavity 22. The inlet section of the first cavity 18 is connected to air supply means integrated into a root of the blade and is therefore arranged at a radially internal end of the first cavity. The outlet section of the third cavity 22 is generally formed in proximity to the radially external end of the cavity, and has the general shape of ports formed in the pressure-side and/or suction-side walls and/or in a bottom wall delimiting the radially external end of the cavity.

Thus, the air flows in the first and third cavities 18, 22 in the radial direction toward the outside, whereas the air flows in the second cavity 20 in the radial direction toward the inside.

Due to the force of the Coriolis effect induced by the blade rotating around the engine axis, the applicant has realised that the air flowing in the first and third cavities 18, 22 is deflected in the direction of the pressure-side wall 14 to the detriment of the suction-side wall 16, whereas the opposite occurs in the second cavity 20.

DISCLOSURE OF THE INVENTION

The aim of the invention is especially to bring a simple economical and efficient solution to this problem.

To this end, it provides a blade for an aircraft turbomachine turbine, comprising a blade root defining a radially internal end of the blade and an airfoil part radially extending toward the outside from the blade root and having a pressure-side wall and a suction-side wall connected to the pressure-side wall at a leading edge and at a trailing edge of the airfoil part, the airfoil part comprising at least one internal cooling circuit.

Said internal cooling circuit includes a plurality of cavities interconnected in series and distributed into:
  at least one cavity radially extending along the suction-side wall, hereinafter referred to as the "suction-side cavity", and
  cavities radially extending along the pressure-side wall, hereinafter referred to as "pressure-side cavities", in an equal number to the number of suction-side cavity or cavities increased by one.

Moreover, the or each suction-side cavity is separated from at least one the pressure-side cavities by a first internal wall of the airfoil part extending between the pressure-side and suction-side walls.

Each pressure-side cavity has an air inlet section and an air outlet section, said air outlet section of the pressure-side cavity being radially arranged to the outside with respect to said air inlet section of this same pressure-side cavity.

The or each suction-side cavity includes an air inlet section connected to the air outlet section of one of the pressure-side cavities and an air outlet section connected to the air inlet section of another of the pressure-side cavities, said air outlet section of the suction-side cavity being radially arranged toward the inside with respect to said air inlet section of this same suction-side cavity.

Finally, said air inlet section of one of the pressure-side cavities is connected to cooling air supply means.

Thus, the invention enables the air flowing along the pressure-side wall to be deflected by the force of the Coriolis effect in the direction of this pressure-side wall and the air flowing along the suction-side wall to be deflected by the force of the Coriolis effect in the direction of this suction-side wall.

The invention thus makes it possible to significantly improve the cooling homogeneity provided by the cooling circuit of the airfoil part.

Moreover, said at least one suction-side cavity is arranged facing two of said pressure-side cavities, from which it is separated by said first internal wall of the airfoil part, and said at least one suction-side cavity includes at least one first deflector extending protruding from the suction-side wall in the direction of the first internal wall of the airfoil part.

According to the invention, said first deflector has a concavity radially oriented toward the outside and towards a side wall of the suction-side cavity disposed on a same side as the pressure-side cavity to which the air outlet section of said at least one suction-side cavity is connected.

Such a first deflector enables part of the stream of air to be oriented towards an area spaced apart from the main path followed by the air within the cooling circuit.

Preferably, the first deflector is connected to the first internal wall of the airfoil part.

Alternatively, the first deflector can stop at a distance from the first internal wall of the airfoil part.

Preferably, each pressure-side cavity is separated from at least another adjacent pressure-side cavity by a second internal wall of the airfoil part linking the pressure-side wall to the first internal wall of the airfoil part.

The first deflector advantageously includes a radially external end extending in the air inlet section of said at least one suction-side cavity and a radially internal end connected to said side wall of the suction-side cavity disposed on the same side as the pressure-side cavity to which the outlet section of the suction-side cavity is connected, said first deflector being provided with air through-ports.

The deflector thus enables part of the stream of air to be oriented in the direction of a radially external area of the suction-side cavity, this area being offset with respect to the air inlet of this cavity.

Preferably, said at least one suction-side cavity includes at least one second deflector extending protruding from the suction-side wall in the direction of the first internal wall of the airfoil part stopping at a distance from the first internal wall, and configured as an inverted V with a vertex radially oriented toward the outside.

Such a deflector enables part of the stream of air to be oriented in the direction of side regions of the cavity.

Preferably, the air outlet section of one of the pressure-side cavities of said cooling circuit communicates with the outside of the blade through air outlet ports formed in at least one of:
  the pressure-side wall, and
  a bottom wall delimiting a radially external end of the pressure-side cavity.

These outlet ports are preferably arranged in relatively hot regions of the pressure-side wall.

Preferably, the airfoil part includes another internal cooling circuit similar to said internal cooling circuit.

The invention also relates to an aircraft turbomachine turbine, comprising at least one rotary disk fitted with blades of the above-described type.

The invention also relates to an aircraft turbomachine, comprising at least one turbine of the above-described type.

BRIEF DESCRIPTION OF THE DRAWINGS

The invention will be better understood, and further details, advantages and characteristics thereof will appear upon reading the following description made by way of non-limiting example and in reference to the accompanying drawings in which.

Throughout these figures, identical references can refer to identical or analogous elements.

DETAILED DISCLOSURE OF PREFERRED EMBODIMENTS

Figure 1:
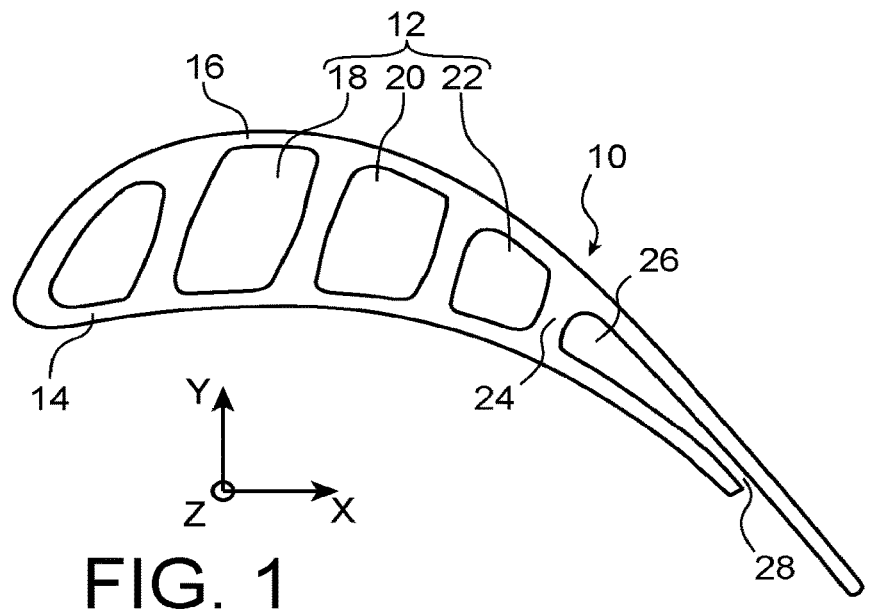
FIG. 1, already described, is a cross-section schematic view of an aircraft turbomachine turbine blade of a known type.
Figure 2:
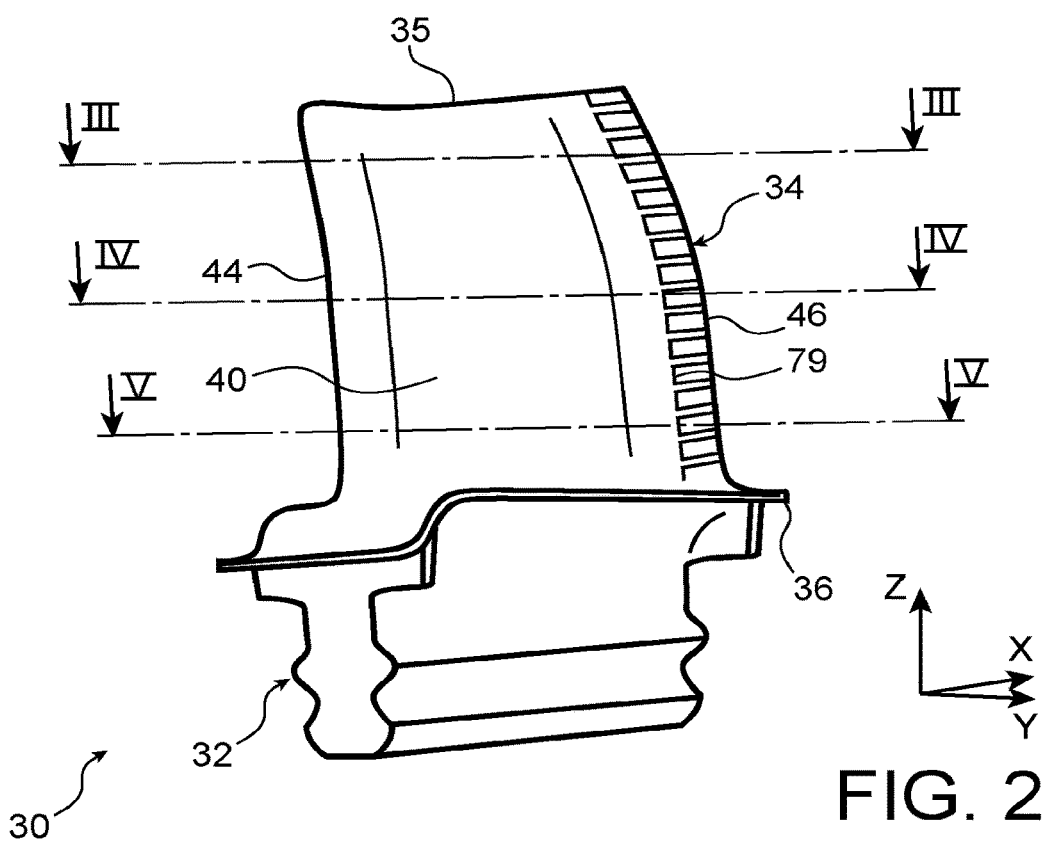
FIG. 2 is a perspective schematic view of an aircraft turbomachine turbine blade according to a preferred embodiment of the invention.

FIG. 2 illustrates a blade 30 for an aircraft turbomachine turbine according to a preferred embodiment of the invention, generally comprising a blade root 32 to which is connected an airfoil part 34 ending by a vertex 35 of the blade on the opposite side of the blade root 32. The blade root includes a radially internal part for enabling the blade to be retained by snap fit into a rotor disk, in a well-known manner. Moreover, the blade root is connected to the airfoil part through an aerodynamic platform 36 for internally delimiting a main stream flow channel within the turbine.

In the present description, the direction X is a direction corresponding to the direction of the engine axis when the blade 30 is mounted on a rotor disk within a turbomachine turbine. The direction Z is the radial direction with respect to the direction X, which merges with the direction of the length or of the span of the blade. The direction Y is such that the three directions X, Y and Z form an orthogonal reference frame. A plane is said to be transversal if it is parallel to the directions X and Y.

Figure 3:
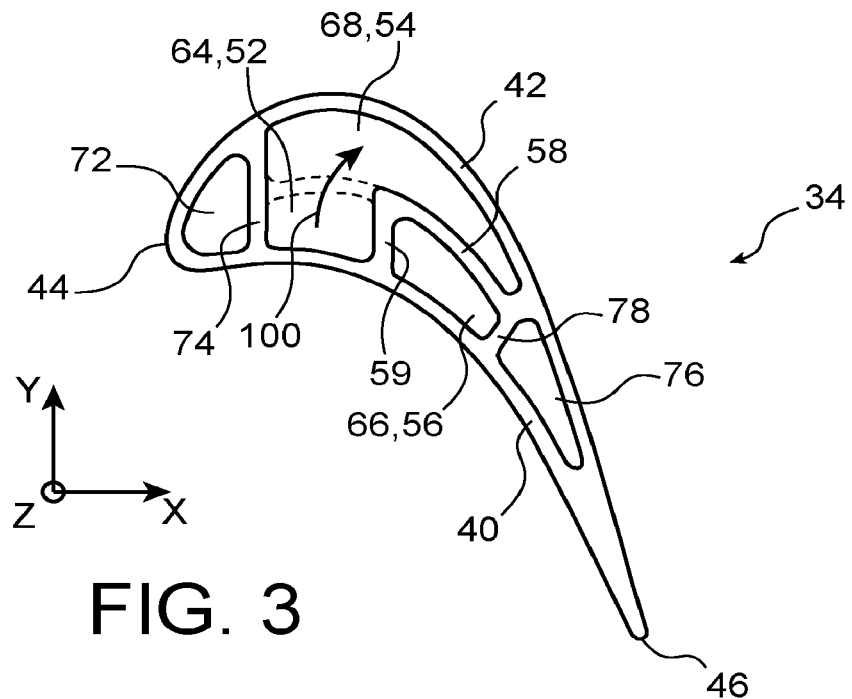
FIGS. 3 to 5 are cross-section schematic views of the airfoil part of the blade of FIG. 2, respectively along the planes III-III, IV-IV and V-V of FIG. 2.
Figure 4:
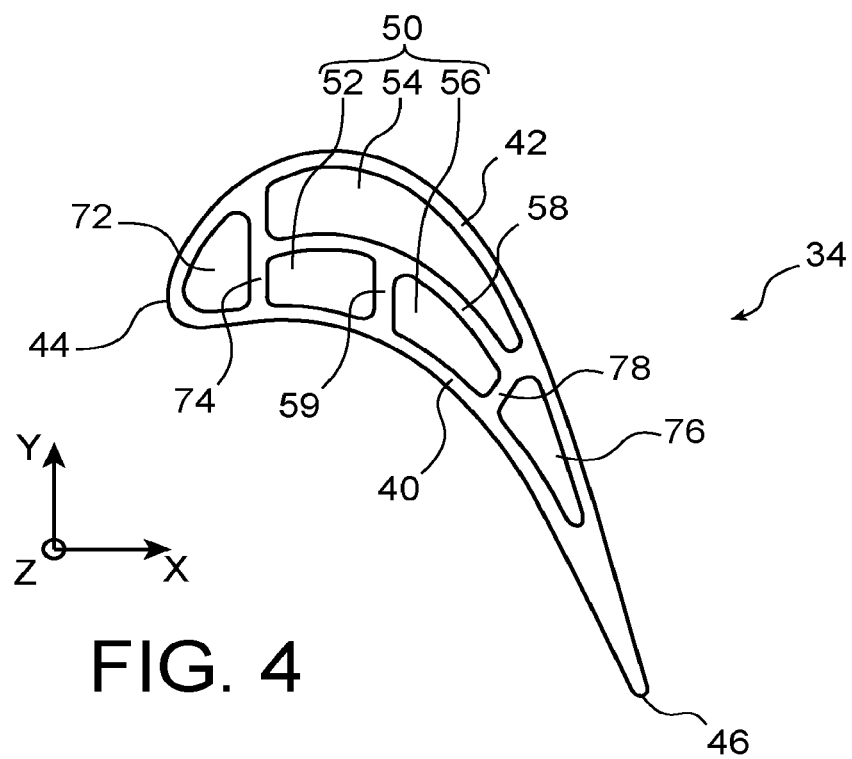
Figure 5:
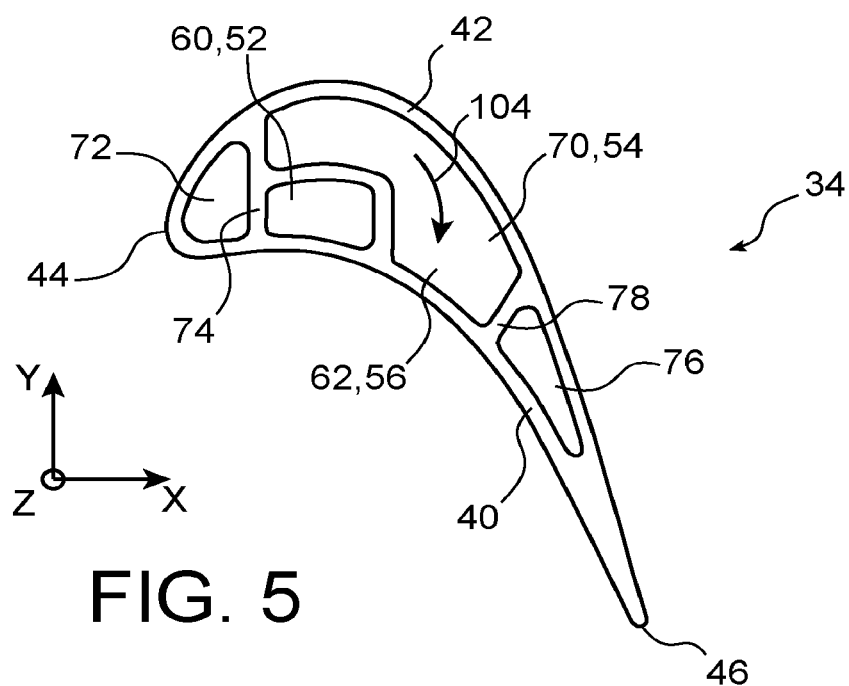

As shown in FIGS. 3 to 5 illustrating the airfoil part 34 in a cross-section, respectively along the planes III-III, IV-IV and V-V of FIG. 2, the airfoil part generally includes a pressure-side wall 40 and a suction-side wall 42 connected to each other at a leading edge 44 and at a trailing edge 46 of the airfoil part.

The airfoil part 34 comprises an internal cooling circuit 50 formed of three cavities interconnected in series and each extending radially, that is along the direction of the span of the airfoil part.

These three cavities, which can be seen in FIG. 4, are distributed into a first cavity 52, a second cavity 54 and a third cavity 56. The second cavity 54 extends along the suction-side wall 42, and for convenience is referred to as the "suction-side cavity" in what follows. In contrast, the first and third cavities 52, 56 extend along the pressure-side wall 40, and are referred to as "pressure-side cavities" in what follows. In the illustrated example, there are thus two pressure-side cavities 52, 56 of the cooling circuit, whereas this cooling circuit includes a single suction-side cavity 54.

The suction-side cavity 54 is separated from the pressure-side cavities 52 and 56 by a first internal wall 58 of the airfoil part, which extends between the pressure-side and the suction-side walls 40 and 42, at a distance of each of these walls. Both pressure-side cavities 52 and 56 are separated from one another by a second internal wall 59 of the airfoil part, which links the pressure-side wall 40 to the first internal wall 58 of the airfoil part.

Moreover, each pressure-side cavity 52, 56 has an air inlet section 60, 62 (FIG. 5) and an air outlet section 64, 66 (FIG. 3), arranged so that the air outlet section 64, 66 of each pressure-side cavity is radially positioned toward the outside with respect to the air inlet section 60, 62 of this same pressure-side cavity, as illustrated by the relative position of the planes III-III and V-V of FIG. 2 which respectively correspond to FIGS. 3 and 5. In the illustrated example, the air inlet section 60, 62 of each pressure-side cavity 52, 56 forms a radially internal end region of the cavity, whereas the air outlet section 64 of the pressure-side cavity 52 forms a radially external end region of the cavity.

Furthermore, the suction-side cavity 54 includes an air inlet section 68 connected to the air outlet section 64 of the pressure-side cavity 52, and the suction-side cavity 54 includes an air outlet section 70 connected to the air inlet section 62 of the other pressure-side cavity 56. The air outlet section 70 of the suction-side cavity is radially arranged toward the inside with respect to the air inlet section 68 of this same suction-side cavity, as illustrated by the relative position of the planes V-V and III-III of FIG. 2 which respectively correspond to FIGS. 5 and 3. In the illustrated example, the air outlet section 70 of the suction-side cavity 54 forms a radially internal end region of the cavity, whereas the air inlet section 68 of this suction-side cavity forms a radially external end region of the cavity.

The air inlet section 60 of the pressure-side cavity 52 (FIG. 5) is connected to a cooling air supply device integrated into the root 32 of the blade 30. This cooling air supply device cannot be seen in figures and can be of a known type from those skilled in the art.

The interconnection in series of the three cavities 52, 54, 56 thus enables the flow of a stream of cooling air from the air inlet 60 of the pressure-side cavity 52 connected to the cooling air supply device to the outlet section 66 of the other pressure-side cavity 56.

Moreover, the pressure-side cavity 56 communicates with the outside of the blade through air outlet ports formed in the pressure-side wall (they cannot be seen in the figures). Additional air outlet ports of the pressure-side cavity 56 can be formed in a bottom wall delimiting a radially external end of the cavity. In the terminology of the present description, the "air outlet section" 66 of the pressure-side cavity 56 corresponds to the portion of this cavity extending facing the abovementioned air outlet ports.

Apart from the above-described cooling circuit 50 which is peculiar to the invention, the airfoil part 34 further integrates a cooling cavity of the leading edge 72 extending along the leading edge 44 of the airfoil part and delimited by a third internal wall 74 of the airfoil part connected on one side to the pressure-side wall 40 and on the other side to the suction-side wall 42. The cooling cavity of the leading edge 72 communicates with the outside of the blade, for example by means of air outlet ports provided through the pressure-side and suction-side walls (these ports cannot be seen in the figures).

The air supply of the cooling cavity of the leading edge 72 is preferably provided by a connection of this cavity to a cooling air supply device integrated into the root 32 of the blade 30, in a manner known per se commonly referred to as "direct supply". This device is generally distinct from the device supplying the cooling circuit 50.

Similarly, the airfoil part 34 includes a cooling cavity of the trailing edge 76 extending along the trailing edge 46 of the airfoil part and delimited by a fourth internal wall 78 of the airfoil part connected on one side to the pressure-side wall 40 and on the other side to the suction-side wall 42. The cooling cavity of the trailing edge 76 communicates with the outside of the blade by means of air outlet ports provided through the pressure-side wall 40 and having for example the shape of slots 79 (which can be seen in FIG. 2) extending substantially parallel to a transverse plane.

The air supply of the cooling cavity of the trailing edge 76 is for example provided by a connection of this cavity to a cooling air supply device integrated into the root 32 of the blade 30, in a manner known per se commonly referred to as "direct supply". This device is preferably distinct from the device supplying the cooling circuit 50.

Figure 6:
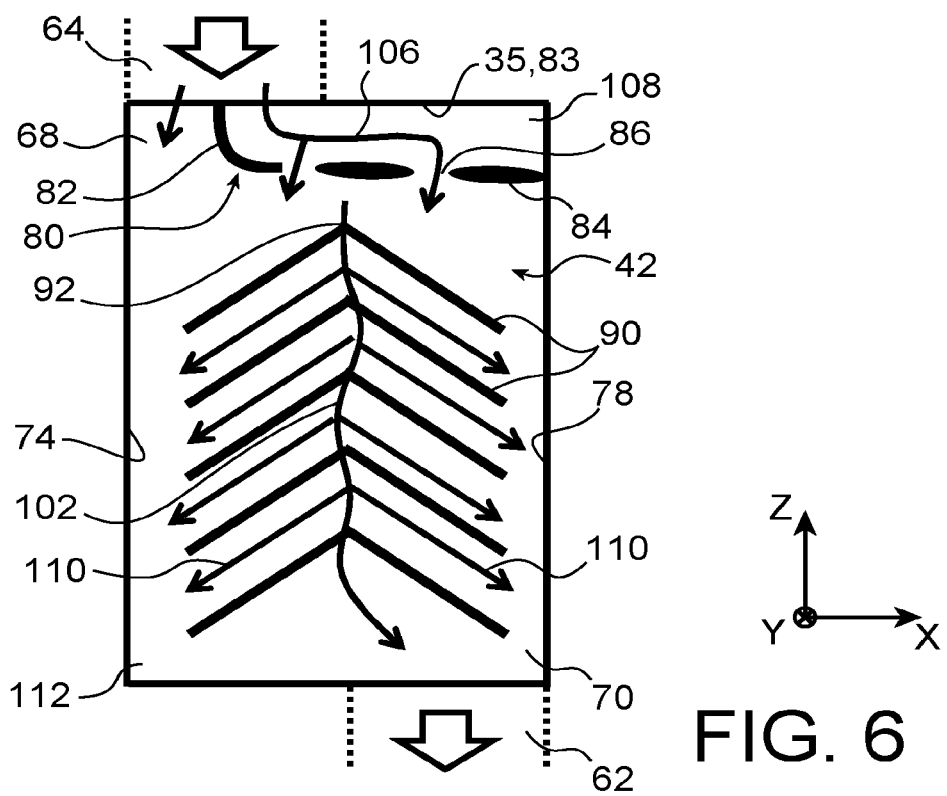
FIG. 6 is a partial schematic view, developed in a plane, of the suction-side wall of the airfoil part of the blade of FIG. 2, seen from the inside of a suction-side cavity of an internal cooling circuit of the airfoil part.

On the other hand, FIG. 6 illustrates preferential characteristics of the cooling circuit 50, enabling the efficiency of the latter to be optimised. More precisely, FIG. 6 shows the suction-side wall 42 seen from the inside of the suction-side cavity 54, along the direction Y, and developed into a plane. For a better understanding of the operation, FIG. 6 also shows the outlet section 64 of the pressure-side cavity 52 and the inlet section 62 of the pressure-side cavity 56, which for convenience of drawing have been respectively depicted above and under the suction-side cavity. It should be understood that these sections are not actually localised this way, but facing this cavity and outside the plane of FIG. 6.

As shown in FIG. 6, the suction-side cavity 54 includes a first deflector 80 extending protruding from the suction-side wall 42 in the direction of the first internal wall 58 of the airfoil part, that is in the direction of the decreasing dimensions Y. In the illustrated example, the first deflector 80 is connected to the first internal wall 58, and is curved, with a concavity radially oriented toward the outside and in the direction of the fourth internal wall 78 which forms a side wall of the suction-side cavity 54 delimiting the latter on the trailing edge 46 side, that is more generally on the pressure-side cavity 56 side to which the outlet section 70 of the suction-side cavity is connected. Alternatively, the first deflector 80 can have a free end extending away from the first internal wall 58.

In the illustrated example, the first deflector 80 has a radially external end part 82 substantially extending along the directions Z and Y, up to a radially external end of the suction-side cavity 54, that is typically up to the bottom wall 83 of the airfoil part closing the cavities 52, 54, 56, 72, 76 in the radial direction toward the outside. The radially external end part 82 preferably extends in the air inlet section 68 of the suction-side cavity 54, therefore on the third internal wall 74 side. Moreover, the first deflector 80 has a radially internal end part 84 substantially extending along the directions X and Y, and connected to the fourth internal wall 78. Finally, the first deflector 80 includes air ports 86.

As shown in FIG. 6, the suction-side cavity 54 includes second deflectors 90 extending protruding from the suction-side wall 42 in the direction of the first internal wall 58 of the airfoil part. The second deflectors 90 each have a free end extending away from the first internal wall 58. These second deflectors 90 are configured as an inverted V with a vertex 92 radially oriented toward the outside, that is toward the bottom wall 83 delimiting the cavities 52, 54, 56, 72 and 76 on the vertex 35 side of the blade. The respective vertices 92 of the second deflectors 90 are advantageously substantially centred on a same line parallel to the radial direction Z.

Other types of deflectors or disruptors can be used alternatively or additionally.

Moreover, an arrangement of deflectors or disruptors similar to the one described above in reference to FIG. 6 can be provided regarding the pressure-side wall within the pressure-side cavities 52, 56, and/or regarding the internal walls 58, 74, 78, within the cavities 52, 54, 56.

The operation of the cooling circuit 50 will now be described.

To do so, an aircraft turbomnachine comprising a turbine comprising a rotor rotary disk carrying the above-described blade 30 is considered. In practice, the disk carries a plurality of blades similar to the blade 30.

In operation, the cooling circuit 50 is supplied with cooling air for example taken at a compressor stage of the turbomachine.

The cooling air enters the pressure-side cavity 52 of the blade 30 through the air inlet section 60 of this cavity and then radially flows toward the outside within this cavity, that is in the direction from the blade root 32 to the blade vertex 35.

The cooling air subsequently passes in the outlet section 64 of the pressure-side cavity 52 and then in the inlet section 68 of the suction-side cavity 54 (arrow 100 in FIG. 3), and then the air radially flows toward the inside within this suction-side cavity 54, that is in the direction from the blade vertex 35 to the blade root 32 (arrow 102 in FIG. 6).

The cooling air subsequently passes in the outlet section 70 of the suction-side cavity 54 and then in the inlet section 62 of the pressure-side cavity 56 (arrow 104 in FIG. 5), and then the air radially flows toward the outside within this pressure-side cavity 56.

According to a principle of the present invention, the air flowing in the pressure-side cavities 52 and 56 thus radially flows toward the outside whereas the air flowing in the suction-side cavity 54 radially flows toward the inside. As a result, the air flowing in the pressure-side cavities 52 and 56 is deflected toward the pressure-side wall 40 by the force of Coriolis effect due to the rotation of the rotor, whereas the air flowing in the suction-side cavity 54 is deflected toward the suction-side wall 42 by the force of the Coriolis effect. Thus, the pressure-side and suction-side walls are optimally and homogeneously cooled.

It should be noted that the successive turnovers or connections between the different cavities forming the cooling circuit 50 are generally oriented in the direction of the thickness of the airfoil part.

Particularly, the air flowing in the suction-side cavity 54 is partly deflected by the first deflector 80 (arrow 106 in FIG. 6) in the direction of the fourth internal wall 78 in a radially external portion of the cavity so as to optimise the cooling of an area 108 of the suction-side cavity 54 near the radially external end of this cavity and offset with respect to the air outlet 64 of the pressure-side cavity 52. The air deflected by the first deflector 80 subsequently passes through air ports 86 and radially proceeds toward the inside.

Moreover, the stream of air 102 is partly deflected toward the side walls of the suction-side cavity 54, that is toward the third and fourth internal walls 74 and 78 of the airfoil part (arrows 110). This makes it possible to optimise the cooling of an area 112 of the suction-side cavity 54 near the radially internal end of this cavity and offset with respect to the air inlet 62 of the pressure-side cavity 56.

Figure 7:
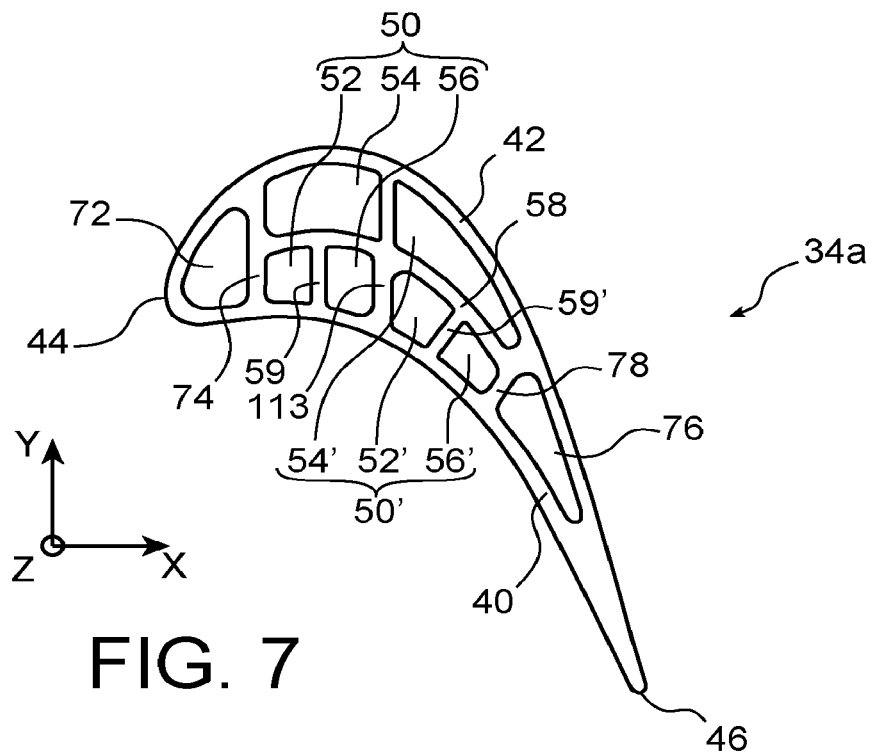
FIG. 7 is a similar view to FIG. 4, illustrating an alternative implementation of the invention.

FIG. 7 illustrates the airfoil part 34*a* of a blade according to an alternative implementation of the invention, which is distinguished from the above-described blade 30 by the airfoil part 34*a* including two cooling circuits 50 and 50'. Each of these cooling circuits is analogous to the cooling circuit 50 of FIGS. 3 to 6.

As shown in FIG. 7, the pressure-side cavities 56 and suction-side cavities 54 belonging to the cooling circuit 50 located on the leading edge 44 side are respectively separated from the pressure-side 52' and suction-side 54' cavities, belonging to the cooling circuit 50' located on the trailing edge 46 side, by a fifth internal wall 113 of the airfoil part linking the pressure-side cavity 40 to the suction-side cavity 42.

Moreover, the air inlet section of the pressure-side cavity 52, 52' of each of both cooling circuits 50 and 50' is connected to the cooling air supply device integrated into the root 32 of the blade 30.

Of course, the or each cooling circuit according to the invention can comprise a greater number of cavities than in the above-described examples, as long as the number of pressure-side cavities is equal to the number of suction-side cavities increased by one.

Figure 8:
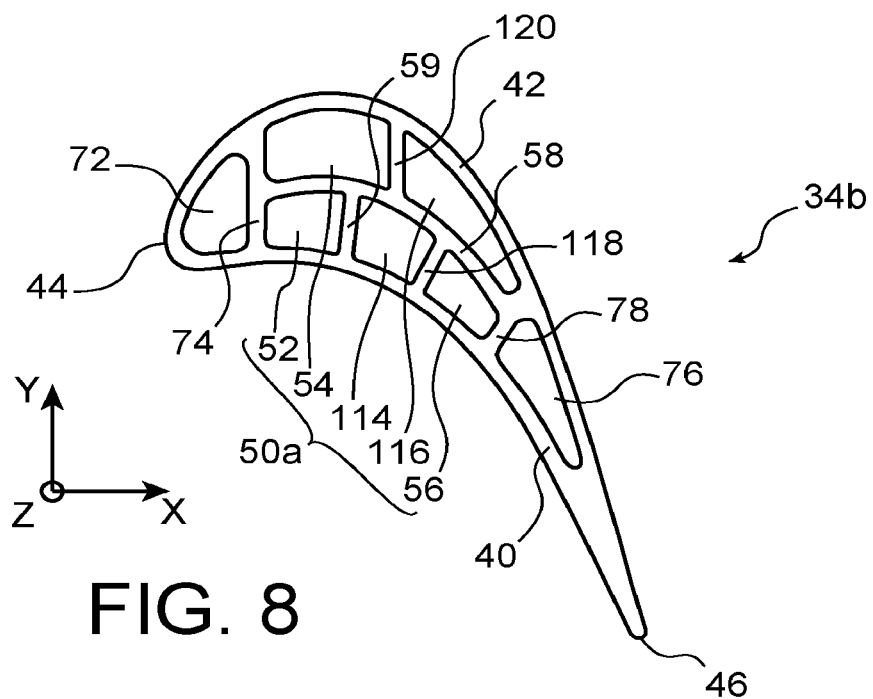
FIG. 8 is a similar view to FIG. 4, illustrating another alternative implementation of the invention.

Thus, FIG. 8 illustrates the airfoil part 34*b* of a blade according to another alternative implementation of the invention, which is distinguished from the above-described blade 30 by the airfoil part 34*b* including a cooling circuit 50*a* comprising two suction-side cavities and three pressure-side cavities interconnected in series.

More precisely, an intermediate pressure-side cavity 114 is positioned between the pressure-side cavity 52, connected to the cooling air supply device, and the pressure-side cavity 56 leading to the outside of the airfoil part by the above-described air outlet ports. Moreover, a suction-side cavity 116 is positioned on the suction-side cavity 54 side.

The pressure-side cavities 114 and 56 are separated from one another by a fifth internal wall 118 of the airfoil part linking the pressure-side wall 40 to the first internal wall 58, whereas the suction-side cavities 54 and 116 are separated from one another by a sixth internal wall 120 of the airfoil part, linking the first internal wall 58 to the suction-side wall 42.

The outlet section of the intermediate pressure-side cavity 114 is connected to the inlet section of the suction-side cavity 116, and the outlet section of the suction-side cavity 116 is connected to the inlet section of the pressure-side cavity 56.

Thus, the cooling air radially flows toward the outside along the pressure-side wall 40 in each of the pressure-side cavities 52, 114 and 56, and it radially flows toward the inside along the suction-side wall 42 in each of the suction-side cavities 54 and 116.

The invention claimed is:

1. A blade for an aircraft turbomachine turbine, comprising:
    a blade root defining a radially internal end of the blade; and
    an airfoil part extending radially outward from the blade root and having a pressure-side wall and a suction-side wall connected to the pressure-side wall at a leading edge and at a trailing edge of the airfoil part, the airfoil part comprising at least one internal cooling circuit,
    wherein said internal cooling circuit includes a plurality of cavities interconnected in series and distributed into:
    at least one cavity radially extending along the suction-side wall, hereinafter referred to as the "suction-side cavity", and
    cavities radially extending along the pressure-side wall, hereinafter referred to as the "pressure-side cavities", in an equal number to the number of suction-side cavity or cavities increased by one,
    and wherein:
    the at least one suction-side cavity is separated from at least one of the pressure-side cavities by a first internal wall of the airfoil part extending between the pressure-side and the suction-side walls,
    each pressure-side cavity has an air inlet section and an air outlet section, said air outlet section of each pressure-side cavity being arranged radially outward with respect to said air inlet section of each pressure-side cavity,
    the at least one suction-side cavity includes an air inlet section connected to the air outlet section of one of the pressure-side cavities and an air outlet section connected to the air inlet section of another of the pressure-side cavities, said air outlet section of the at least one suction-side cavity being radially arranged toward the inside with respect to said air inlet section of the at least one suction-side cavity, said air inlet section of one of the pressure-side cavities is connected to cooling air supply means, said at least one suction-side cavity is arranged facing two of said pressure-side cavities, from which the at least one suction-side cavity is separated by said first internal wall of the airfoil part, and said at least one suction-side cavity includes at least one first deflector extending protruding from the suction-side wall in a direction of the first internal wall of the airfoil part, wherein said first deflector has a concavity oriented radially outward and towards a side wall of the at least one suction-side cavity disposed on a same side as the pressure-side cavity to which the air outlet section of said at least one suction-side cavity is connected, wherein the first deflector includes a radially external end extending in the air inlet section of said at least one suction-side cavity, said first deflector being provided with air through-ports.

2. The blade according to claim 1, wherein the first deflector is connected to the first internal wall of the airfoil part.

3. The blade according to claim 1, wherein the first deflector stops at a distance from the first internal wall of the airfoil part.

4. The blade according to claim 1, wherein each pressure-side cavity is separated from at least another adjacent pressure-side cavity by a second internal wall of the airfoil part linking the pressure-side wall to the first internal wall of the airfoil part.

5. The blade according to claim 1, wherein the first deflector includes a radially internal end connected to said side wall of the at least one suction-side cavity disposed on the same side as the pressure-side cavity to which the outlet section of the at least one suction-side cavity is connected.

6. The blade according to claim 1, wherein said at least one suction-side cavity includes at least one second deflector extending protruding from the suction-side wall in the direction of the first internal wall of the airfoil part stopping at a distance from the first internal wall, and configured as an inverted V with a vertex oriented radially outward.

7. The blade according to claim 1, wherein the air outlet section of one of the pressure-side cavities of said cooling circuit communicates with an outside of the blade through air outlet ports formed in at least one of:
- the pressure-side wall, and
- a bottom wall delimiting a radially external end of the pressure-side cavity.

8. The blade according to claim 1, wherein the airfoil part includes a second internal cooling circuit.

9. An aircraft turbomachine turbine, comprising at least one rotary disk fitted with blades according to claim 1.

10. An aircraft turbomachine, comprising at least one turbine according to claim 9.

* * * * *

UNITED STATES PATENT AND TRADEMARK OFFICE
CERTIFICATE OF CORRECTION

PATENT NO.       : 9,869,187 B2
APPLICATION NO.  : 15/305605
DATED            : January 16, 2018
INVENTOR(S)      : Charlotte Marie Dujol et al.

It is certified that error appears in the above-identified patent and that said Letters Patent is hereby corrected as shown below:

In the Specification

Column 6, Line 59, change "aircraft turbomnachine" to --aircraft turbomachine--.

Signed and Sealed this
Eighteenth Day of June, 2019

Andrei Iancu
*Director of the United States Patent and Trademark Office*